United States Patent
Lewis

(10) Patent No.: US 10,721,878 B2
(45) Date of Patent: Jul. 28, 2020

(54) TORNADO UNIT

(71) Applicant: Nathanial Henry Lewis, Fallon, NV (US)

(72) Inventor: Nathanial Henry Lewis, Fallon, NV (US)

( * ) Notice: Subject to any disclaimer, the term of this patent is extended or adjusted under 35 U.S.C. 154(b) by 122 days.

(21) Appl. No.: 15/998,253

(22) Filed: Jul. 24, 2018

(65) Prior Publication Data

US 2020/0029511 A1    Jan. 30, 2020

(51) Int. Cl.
| | |
|---|---|
| *A01G 15/00* | (2006.01) |
| *B62D 25/00* | (2006.01) |
| *B60P 3/30* | (2006.01) |
| *B60Q 1/30* | (2006.01) |
| *A62C 27/00* | (2006.01) |

(52) U.S. Cl.
CPC ............... *A01G 15/00* (2013.01); *B60P 3/30* (2013.01); *B62D 25/00* (2013.01); *A62C 27/00* (2013.01); *B60Q 1/30* (2013.01)

(58) Field of Classification Search
CPC ........... A01G 15/00; B60P 3/30; A62C 27/00; A62C 31/005; A62C 31/05; B62D 63/02
See application file for complete search history.

(56) References Cited

U.S. PATENT DOCUMENTS

| | | | | |
|---|---|---|---|---|
| 2,360,397 | A * | 10/1944 | Carpenter | A62C 27/00 169/24 |
| 4,058,256 | A * | 11/1977 | Hobson | A62C 27/00 239/101 |
| 7,264,062 | B1 * | 9/2007 | Ham | A62C 27/00 169/24 |
| 7,631,700 | B1 * | 12/2009 | Gil | A62C 27/00 169/13 |
| 7,810,420 | B2 * | 10/2010 | Konstantinovskiy | A01G 15/00 239/14.1 |
| 8,262,314 | B2 * | 9/2012 | Sirovich | A01G 15/00 239/2.1 |
| 2010/0038098 | A1 * | 2/2010 | Groonwald | A62C 27/00 169/24 |
| 2010/0072297 | A1 * | 3/2010 | Savla | A01G 15/00 239/14.1 |
| 2010/0276533 | A1 * | 11/2010 | Gravina | A01G 15/00 244/3.11 |
| 2019/0000022 | A1 * | 1/2019 | Al-Aani | A01G 15/00 |

FOREIGN PATENT DOCUMENTS

JP    2013018469 A  *  1/2013

* cited by examiner

*Primary Examiner* — John Villecco

(57) ABSTRACT

This is a mobile vehicle with three basic eternal features a conical front, cylindrical body and ellipsoidal rear end. The vehicle will have stationary rear wheels and steerable front wheels. This design will allow the vehicle to enter a tornado safely and spray cold water through its outer nozzles into the tornado, reducing its energy and destructive power. This vehicle can become a tornado hunter. This vehicle can be used in fighting large fires on relatively level terrains, by creating a watery path-like barricade.

1 Claim, 2 Drawing Sheets

TORNADO UNIT

BACKGROUND OF THE INVENTION

We have large snow plowers to remove large snow falls from our highways and freeways making life a little better for everyone. We will never be able to stop large snow storms. Tornadoes are very destructive, year after year, I feel humans can greatly reduce this destruction, not eliminate it completely. The same as the large snow storms example above; I believe this concept of a tornado unit will be able to reduce a tornado from level 3, 4 or 5 to level 1 or 2.

SUMMARY OF THE INVENTION

Our advance in science, engineering and technology should be able to help us humans with mass destructions by tornadoes. A properly design vehicle that can enter safely a tornado of great forces and greatly reducing these forces with cold water. This mobile vehicle with three important external shapes will be able to achieve a design that is simple, economical, durable and efficient.

DETAIL DESCRIPTIONS

Figure 1:
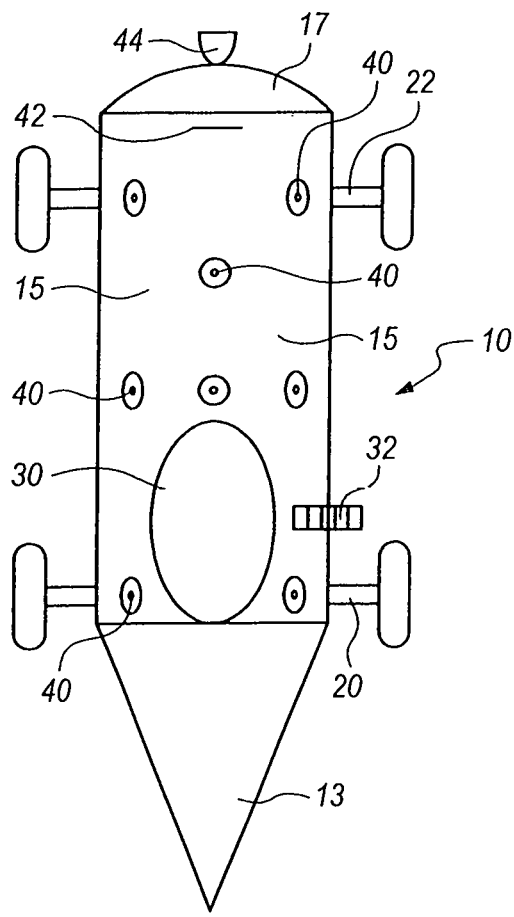
FIG. 1 is a top view of a mobile vehicle.
Figure 2:
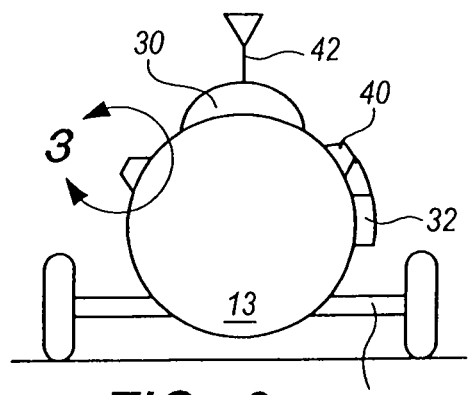
FIG. 2 is a front view of FIG. 1.
Figure 3:
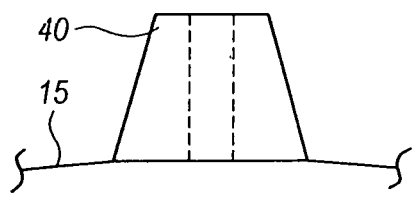
FIG. 3 is an enlarged view of a nozzle of the mobile vehicle.

Refer to FIGS. 1, 2 and 3. This TORNADO UNIT is a mobile vehicle 10 with three outer geometric shapes (features) comprising a relatively conical front 13, a relatively cylindrical body 15 and a partial ellipsoid rear end (saucer shape) 17; other geometric shapes would be inferior. This design should be able to withstand the great forces within a tornado. It can then penetrate a tornado safely and spray cold water through its outer water nozzles 40 into the tornado and drain some or all of its energy. After it passes over and all is safe and there should be no major damage to the vehicle 10.

The vehicle 10 will have stationary rear wheels 22 and steerable front wheels 20 extended from its body 15. It has a control antenna 42 for remote controlling the vehicle 10, and has a large location light 44 at its rear for locating the vehicle 10 position when heading towards a tornado. There is a ladder 32 to a driver compartment 30. The driver compartment 30 is mounted in the upper front part of the body 15 near the conical nose 13.

Figure 4:
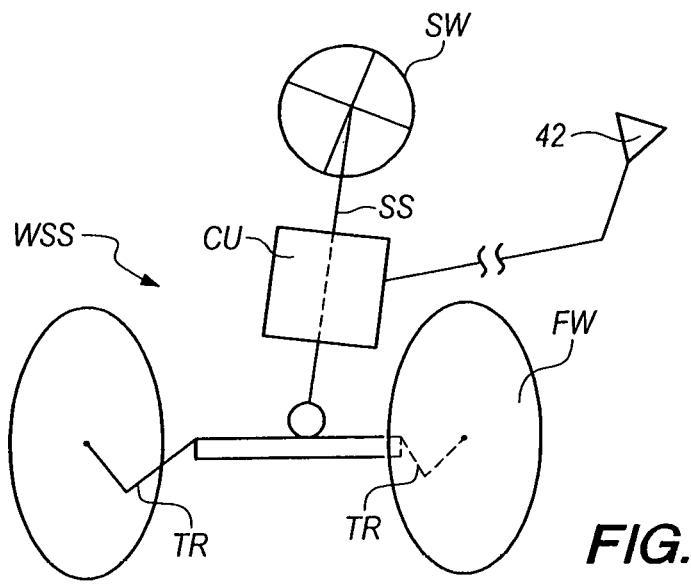
FIG. 4 is schematic of a typical front wheel steering system of the mobile vehicle.

FIG. 4 is a schematic of a typical front wheel steering system WSS for both manned and unmanned controls. A steering wheel SW is connected to a steering shaft SS and tie rods TR to front wheels FW for manual control. There is a control unit CU of electronic and mechanical systems for controlling the vehicle 10 remotely by way of its control antenna 42.

Figure 5:
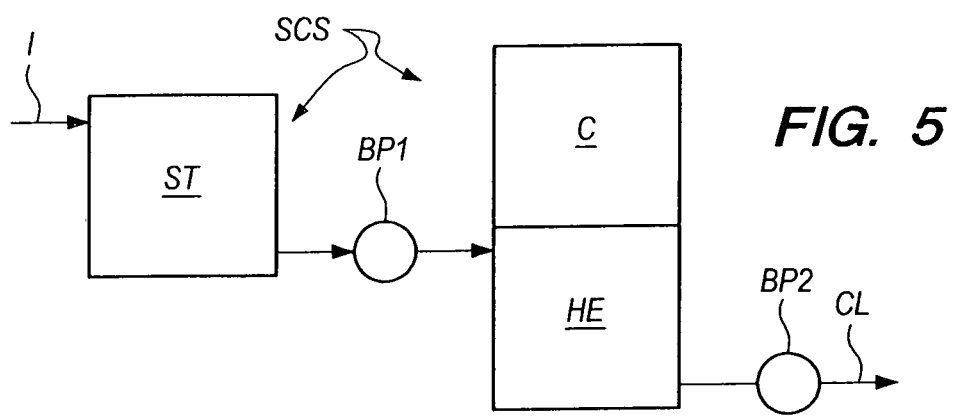
FIG. 5 is a block diagram of a water storage/water cooling system inside the mobile vehicle.

FIG. 5 is a block diagram of a water storage/water cooling system SCS with its major parts. The water storage tank ST has an input I line and output water line and its booster pump BP1 is connected to a water cooling section. The water cooling section comprises a condenser (hot coils) C and a compressor that are connected to a heat exchanger (cold coils) HE and an expansion value. This cooling section is connected to a second booster pump BP2 and a main cold water output line CL is connected to several exterior water nozzles 40 of the vehicle 10; see FIGS. 1, 2 and 3. The nozzles 40 are mounted on and near top and from front to rear of the body 15 and pointing upward.

Figure 6:
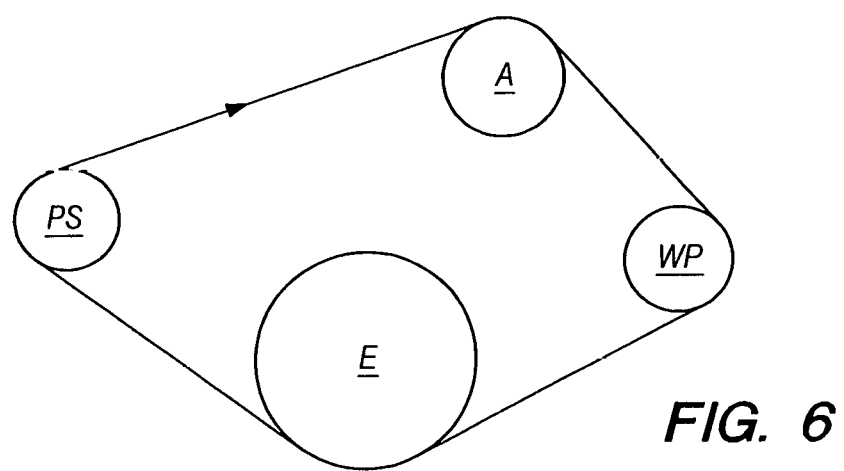
FIG. 6 is a schematic of a typical fossil fuel engine with a belt connecting three other systems to power them inside the mobile vehicle.

FIG. 6 is a schematic of a typical fossil fuel engine E with three of its major auxiliary systems. The alternator A which is part of the ELECTRICAL SYSTEM along with the battery, starter, lights, ignition switch, voltage regulator, meters and other parts. There is power steering PS and air condition is option. The water pump WP which is part of the COOLING SYSTEM along with the radiator, fan, pressure cap, hoses, reservoir, thermostat, temperature gauge and other important parts.

The engine E placed at the rear of the vehicle 10 and connected to the rear wheels 22. A typical FUEL SYSTEM should have a fuel tank, fuel pump, filler pipe, fuel filler, fuel feed line, fuel return line, carburetor, fuel gauge and other important parts.

A typical EXHAUST SYSTEM should have an exhaust manifold, muffer unit, tail pipe and other important parts. The vehicle 10 should have braking, suspension, lubrication and transmission systems. A simple horn, near view mirrors and windshield wipers are needed.

A more economical version of the vehicle 10 will have no unmanned control unit CU and rear control antenna 42 (see FIG. 4) or no large rear location light 44 (see FIG. 1) A driver could safely drive the vehicle 10 into a violent tornado and reduce its great internal forces with cold water. The front of the vehicle 10 can be any geometric shape, but the relatively conical front 13 is the best.

A version of this vehicle 10 can have non-pneumatic tires for greater durability and the driver seat can be design for more comfort. The vehicle 10 can be painted bright red to give it good visibility. This vehicle 10 can be used in fighting large fires on relatively level terrains by creating a wide, watery path-like barricade.

The vehicle 10—a search and rescue version—can have a trailer hitch so it can pull a trailer containing life rafts and other emergency items. It can be design to wade through 5 feet of water.

I claim:

1. A tornado unit for entering a tornado safely and spray cold water into it to reduce its internal forces; said tornado unit comprising:
   a conical front nose connected to a cylindrical body, which is connected to a rear end that has a shape of a partial ellipsoid;
   rear wheels connected to a rear fossil fuel engine and front wheels connected to a manned steering system, said rear wheels and said front wheels are extended out from said cylindrical body, wherein a wheel track width of both the front and rear wheels is larger than a diameter of the cylindrical body to provide stability to the tornado unit;
   several water nozzles pointing upward and located on the exterior of said cylindrical body, said water nozzles are from front to rear of the cylindrical body and on a top portion of said cylindrical body, said water nozzles are connected to an inner water storage-water cooling system;

a driver compartment that is mounted in the upper front part of said cylindrical body, near said conical front nose and adjacent said manned steering system;

whereby, said conical front nose, said cylindrical body, said rear end, and said inner water storage-water cooling system will allow said tornado unit to enter a tornado safely.

\* \* \* \* \*